United States Patent Office 3,137,610
Patented June 16, 1964

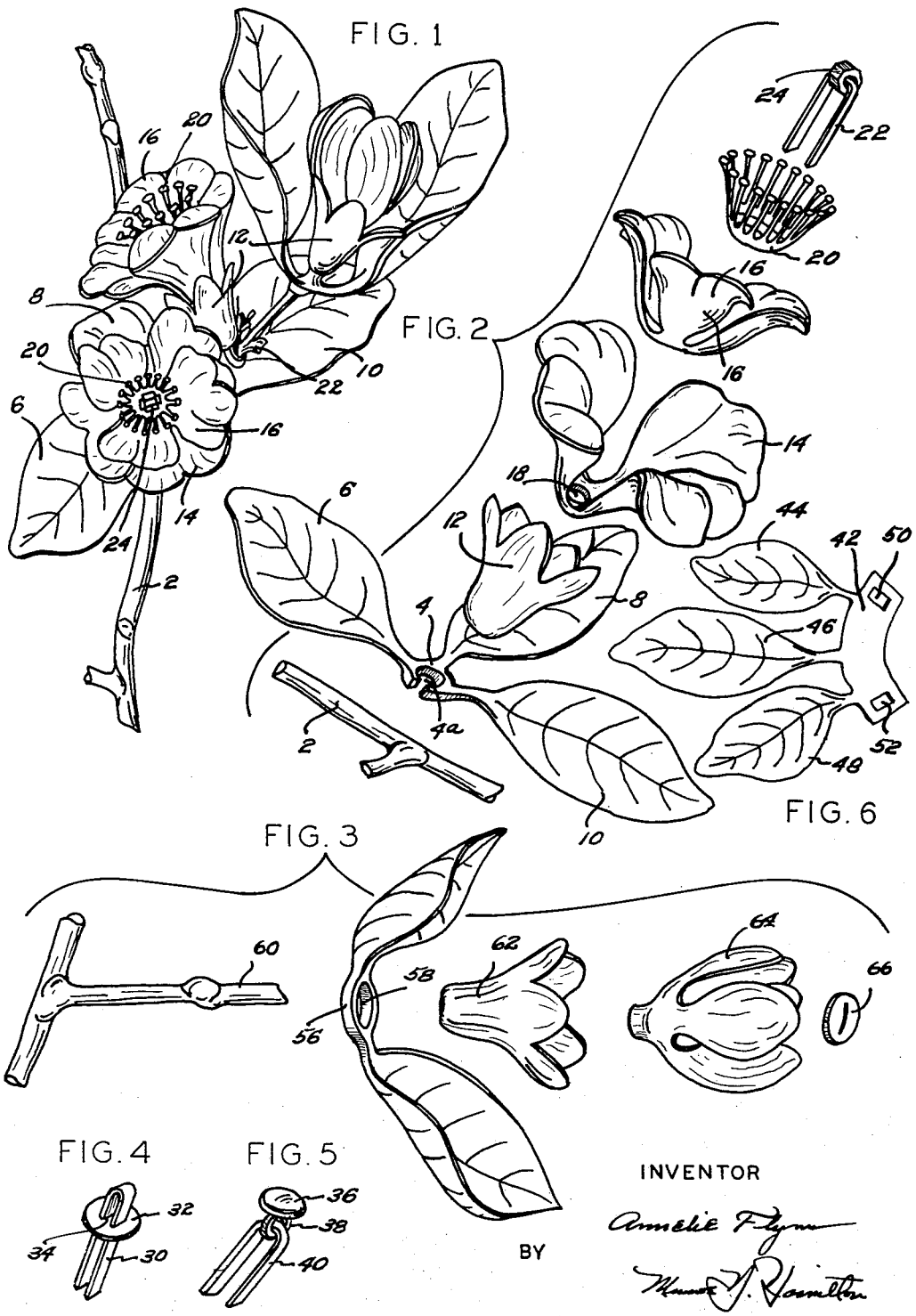
June 16, 1964     A. FLYNN     3,137,610
ARTIFICIAL FLOWER CONSTRUCTION
Filed May 2, 1961
INVENTOR
Amélie Flynn
BY
ATTORNEY

3,137,610
ARTIFICIAL FLOWER CONSTRUCTION
Annelie Flynn, 26 Patterson Road, Lexington, Mass.
Filed May 2, 1961, Ser. No. 107,173
3 Claims. (Cl. 161—30)

This invention relates to artificial flowers and in particular to artificial flower construction of the type in which molded plastic components are separately formed and then assembled one against another to simulate the several parts of a flower or blossom as they appear growing on a branch or stem of a plant.

It is a chief object of the invention to provide improved methods and means for assembling artificial flower components and to devise a combination of parts by means of which a fully assembled artificial flower may be detachably secured to a branch, stem, or other portion of a plant or shrub.

Another object of the invention is to provide an artificial flower construction which may be conveniently produced by plastic molded techniques, and whose components may be combined with a single holding device to facilitate rapid assembly and to produce a life-like appearance in the finished product.

The nature of the invention and its other objects and novel features will be more fully understood and appreciated from the following description of preferred embodiments of the invention selected for purposes of illustration and shown in the accompanying drawings, in which:

FIG. 1 is an elevational view of the artificial flower construction of the invention;

FIG. 2 is an exploded view showing the various components of the structure in FIG. 1 separated from one another;

FIG. 3 is another exploded view illustrating a different method of holding the components together; and FIGS. 4, 5 and 6 are detailed views of modified forms of flower components.

Referring more in detail to the structure shown in the drawings, numeral 2 denotes a branch or stem such as, for example, a part of a flowering shrub. On this supporting member I secure the artificial flower construction of the invention. The various components of the flower construction in FIG. 1 are shown in more detail in FIG. 2 and include a multi-leaf component having a central body portion 4 from which extend leaves 6, 8 and 10. These leaves are preferably formed as an integral part of the body portion 4 being produced, for example, by plastic molding techniques of conventional nature making use of well-known molding substances such as polyethylene, vinyl compounds and other plastic or fibrous bodies.

The body portion 4 is constructed with a central opening 4a, and is designed to support thereon a cup-shaped base 12 which in turn receives molded petal components as 14 and 16. Both the cup-shaped base 12, and the petal components 14 and 16, are formed with central openings which are arranged to register with the opening 4a of the leaf component. One of these openings is denoted by the numeral 18 in the petal component 14.

Superimposed on the petal component 16 is a stamen component which is similarly formed with a central opening and which is adapted to nest snugly within the member 16 as is suggested in the lowermost flower shown in FIG. 1.

In accordance with the invention, I provide a special holding means for securing all of these components in nested relation to one another and also to a branch or stem such as the branch 2. For this purpose I employ a U-shaped retainer element 22 which may, for example, consist of a length of flexible material such as a steel wire which is covered with paper dyed to correspond in color with the color of the branch or stem on which the flower is to be secured. This retaining element 22 is provided with a cap element 24 through which the member 22 extends. The cap is adapted to be snugly secured against the stamen in the position shown in FIG. 1 with the retaining element having its two free ends extending through slots in the stamen 20, and also through each of the openings in the petal components, cup-shaped base, and leaf components to provide tying extremities which can be bent around the branch or stem 2 in tightly secured relationship as is better shown in FIG. 1.

By means of this arrangement it will be apparent that I am enabled to secure all of the components by one holding element and this single holding element is adaptable for engagement with any type and size of branch or stem where it may be desired to mount a flower. The combination of a locking center, wire retainer element, and flower components combine to provide an easily assembled kit which can be manufactured and sold to consumers who may wish to prepare a wide range of flower arrangements according to individual taste.

The flexible retainer element may also be used either indoors or outdoors with the result that weather resistant flowers may be attached to shrubs during winter months or other seasons when no flowering takes place to provide desirable decorative effects of many different types.

It will be understood that the combination of a flexible wire-type retaining element with flower components and a base, stem, or branch, may be varied in many respects and may be utilized with a great many different types of flower components.

In FIGS. 4, 5, and 6, I have shown modified arrangements for using the wire-type retaining element in which numeral 30 denotes a wire-type retaining element combined with a disc 32 having slots 34 through which the retaining element extends. It is intended in this case that the disc 32 may be of a size greater than that of the openings in the flower components so that all of these members may be firmly locked together when the retaining element is engaged through them and secured to a suitable base. The appearance of the disc 32 may be purposely designed to simulate various flower shades and conformation to simulate life-like appearance which can be maintained for long periods of time.

In FIG. 5, I have shown a combination of disc 36 with a ring portion 38 through which the retaining element 40 may be engaged to function in the manner already described. Similarly, in FIG. 6, I may form a plastic wrap-around type of base 42, from which extends leaves 44, 46 and 48 as indicated. The wrap-around base 42 is constructed with openings 50 and 52, which when brought into proximity with one another with the base portion wrapped around a branch or twig, may be conveniently secured by a retaining element such as the retaining element 40. In this case a leaf foliage may be seen without actual flower components being employed at all, and with various attractive foliage effects being realized.

In FIG. 3, I have illustrated still another form of the invention in which a leaf component base 56 is formed with an opening 58 adapted to fit over a branch or stem 60. A cup-shaped base 62 is also formed to fit over the branch 60 and a petal component 64 is nested within the base 62 and arranged to have the extremity of the branch 60 project therethrough to receive a locking tab 66 which is designed to fit tightly over the branch 60 in expanded relationship so that the several components are all securely held together. This arrangement also may be very quickly and conveniently employed to assemble a wide range of flower and leaf components on various types of shrubs and flowering stocks.

From the foregoing description it will be seen that I have disclosed a unique combination of flower components and retainer means for assembling various types of flower arrangements on shrubs and branches to provide a life-like appearance which may be varied in different ways whenever desired and which may be utilized either on indoor decorative arrangements, or may be employed out of doors on growing plants and shrubs.

I claim:

1. Artificial flower construction for attachment to a flower supporting branch or the like, said flower construction including a plastic leaf base consisting of a plastic ring portion having an opening of a size suitable for engaging over the said flower supporting branch, a plurality of separated leaf components, including stems which are joined to the ring portion and extend upwardly and outwardly in spaced-apart relationship, a cup shaped flower petal retainer element formed of a flexible plastic material and having a central opening for registering with the said opening in the leaf base, said petal retainer element presenting outwardly flaring scalloped edges, a plastic flower petal component formed with a small tapered bottom adapted to be fitted into the cup shaped flower petal retainer, said flower petal component bottom being of a size adapted to define a stamen pocket and being further provided with a small hole therethrough, a stamen component consisting of an annular bottom section and upwardly projecting tendril, said stamen component fitted into the said stamen pocket and being further recessed to provide a pair of spaced apart slots, a flat wire-like strap member engaged through the slots and projecting into the openings in the flower petal component, petal retainer component and leaf base and adapted to be engaged about the said flower supporting branch.

2. A flower construction according to claim 1 in which the flower petal portion has its central section split to form an interrupted annulus.

3. A structure according to claim 1 in which the ring portion of the leaf component consists of a wrap-around base formed in the shape of a split annulus whose extremities are slotted.

References Cited in the file of this patent

UNITED STATES PATENTS

| | | |
|---|---|---|
| 970,413 | Antonucci | Sept. 13, 1910 |
| 1,715,461 | Loeben | June 4, 1929 |
| 1,929,317 | Kelly | Oct. 3, 1933 |
| 2,514,177 | Brown | July 4, 1950 |
| 2,563,202 | Wurzlow | Aug. 7, 1951 |
| 2,740,218 | Miller | Apr. 3, 1956 |
| 2,806,313 | James | Sept. 17, 1957 |
| 2,881,545 | Decamp | Apr. 14, 1959 |
| 2,984,036 | Adler | May 16, 1961 |
| 3,002,308 | Decamp | Oct. 3, 1961 |
| 3,050,619 | Abramson | Aug. 21, 1962 |